United States Patent
Niedling et al.

(10) Patent No.: US 12,202,397 B2
(45) Date of Patent: Jan. 21, 2025

(54) HEADLIGHT AND CONTROL METHOD FOR A HEADLIGHT

(71) Applicant: HELLA GmbH & Co. KGaA, Lippstadt (DE)

(72) Inventors: Mathias Niedling, Lippstadt (DE); Simon Vogel, Lippstadt (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 50 days.

(21) Appl. No.: 18/114,077

(22) Filed: Feb. 24, 2023

(65) Prior Publication Data

US 2023/0219487 A1    Jul. 13, 2023

Related U.S. Application Data

(63) Continuation of application No. PCT/EP2021/072395, filed on Aug. 11, 2021.

(30) Foreign Application Priority Data

Aug. 26, 2020  (DE) .................. 10 2020 122 322.6

(51) Int. Cl.
*B60Q 1/14*  (2006.01)

(52) U.S. Cl.
CPC ........ *B60Q 1/143* (2013.01); *B60Q 2300/054* (2013.01)

(58) Field of Classification Search
CPC ............. B60Q 1/143; B60Q 2300/054; B60Q 2300/312; B60Q 2300/322;

(Continued)

(56) References Cited

U.S. PATENT DOCUMENTS 7,150,552 B2   12/2006   Weidel
9,821,704 B2   11/2017   Fendt
(Continued)

FOREIGN PATENT DOCUMENTS

CN    111032429 A   *  4/2020   ............. B60Q 1/143
CN    111344592 A   *  6/2020   ............. G01S 17/46
(Continued)

OTHER PUBLICATIONS

International Search Report dated Dec. 1, 2021 in corresponding application PCT/EP2021/072395.

*Primary Examiner* — Abdullah A Riyami
*Assistant Examiner* — Syed M Kaiser
(74) *Attorney, Agent, or Firm* — Muncy, Geissler, Olds & Lowe, P.C.

(57) ABSTRACT

A headlight for vehicles, having a light source unit for emitting light, an optical unit for deflecting the light in accordance with a predefined light distribution, and a control unit for generating a control signal, by means of which the light source unit and/or the optical unit can be controlled, wherein the control signal is generated depending on a number of environmental parameters, wherein an optimization program is stored in the control unit, by means of which optimization program the control signal is calculated from a plurality of individual control signals, wherein by means of the individual control signals different partial light distributions, each dependent on the environmental parameters, can be generated.

13 Claims, 6 Drawing Sheets

Legend:
5 - control unit
8 - optimization program
10 - detection unit
12 - transmission device
15 - processor/computing component

(58) Field of Classification Search
CPC ...... B60Q 2300/332; B60Q 2300/3321; B60Q 2300/333; B60Q 2300/334; B60Q 2300/42; B60Q 2300/45; B60Q 1/085
See application file for complete search history.

(56) References Cited

U.S. PATENT DOCUMENTS

| | | |
|---|---|---|
| 11,014,488 B2 | 5/2021 | Kubitza et al. |
| 2004/0114379 A1* | 6/2004 | Miller .................... B60Q 1/085 362/465 |
| 2005/0275562 A1* | 12/2005 | Watanabe .............. B60Q 1/085 340/933 |
| 2008/0239746 A1 | 10/2008 | Wuller et al. |
| 2015/0016128 A1 | 1/2015 | Doerne et al. |
| 2015/0127227 A1* | 5/2015 | Strolz .................... B60Q 1/085 701/49 |
| 2015/0323152 A1 | 11/2015 | Mayer et al. |
| 2022/0055524 A1* | 2/2022 | Giehl ...................... B60Q 1/02 |

FOREIGN PATENT DOCUMENTS

| | | |
|---|---|---|
| DE | 10129743 A1 | 1/2003 |
| DE | 102005041234 A1 | 3/2007 |
| DE | 102008062640 A1 | 7/2009 |
| DE | 102013213375 A1 | 1/2015 |
| DE | 102014107195 A1 | 11/2015 |
| DE | 102015207543 A1 | 10/2016 |
| DE | 102015012019 A1 | 3/2017 |
| DE | 102017207298 A1 | 11/2018 |
| WO | WO2019038077 A1 | 2/2019 |
| WO | WO-2020192681 A1 * | 10/2020 |

* cited by examiner

Legend:
5 - control unit
8 - optimization program
10 - detection unit
12 - transmission device
15 - processor/computing component

| Category | Possible environmental parameters | Current environmental parameter | Individual control signal | Partial light distribution |
|---|---|---|---|---|
| 1st category | Road course straight | 1 | A1 | TL1 |
| 1st category | Road course to the left | 0 | A2 | TL2 |
| 1st category | Road course to the right | 0 | A3 | TL3 |
| 2nd category | Pedestrians on left few | 1 | A4 | TL4 |
| 2nd category | Pedestrians on left many | 0 | A5 | TL 5 |
| 2nd category | Pedestrians on right few | 0 | A6 | TL6 |
| 2nd category | Pedestrians on right many | 1 | A7 | TL7 |
| 3rd category | Oncoming traffic yes | 1 | A8 | TL8 |
| 3rd category | Oncoming traffic no | 0 | A9 | TL9 |
| 4th category | Weather rain | 0 | A10 | TL10 |
| 4th category | Weather fog | 0 | A11 | TL11 |
| 4th category | Weather sun | 1 | A12 | TL12 |
| 5th category | Road surface asphalt | 1 | A13 | TL13 |
| 5th category | Road surface gravel | 0 | A14 | TL14 |
| 5th category | Road surface pavement | 0 | A15 | TL15 |
| 6th category | City street | 1 | A16 | TL16 |
| 6th category | Country road | 0 | A17 | TL17 |
| 6th category | Highway | 0 | A18 | TL18 |
| ⇓ | | ⇓ | | |
| nth category | Street lighting yes | 1 | An-1 | TLn-1 |
| nth category | Street lighting no | 0 | An | TLn |

Fig. 2

HEADLIGHT AND CONTROL METHOD FOR A HEADLIGHT

This nonprovisional application is a continuation of International Application No. PCT/EP2021/072395, which was filed on Aug. 11, 2021, and which claims priority to German Patent Application No. 10 2020 122 322.6, which was filed in Germany on Aug. 26, 2020, and which are both herein incorporated by reference.

BACKGROUND OF THE INVENTION

Field of the Invention

The invention relates to a headlight for vehicles, having a light source unit for emitting light, an optical unit for deflecting the light in accordance with a predefined light distribution, and a control unit for generating a control signal, by means of which the light source unit and/or the optical unit can be controlled, wherein the control signal is generated depending on a number of environmental parameters. Further, the invention relates to a method for controlling a headlight.

Description of the Background Art

A headlight for vehicles having a light source unit and an optical unit for generating a predefined light distribution is known from DE 10 2005 041 234 A1, which corresponds to US 2008/0239746, which is herein incorporated by reference, and wherein different optical units are assigned to different light sources of the light source unit. This allows different partial light distributions with light spots of different sizes to be generated, which form the predefined light distribution by superimposition.

A headlight for vehicles comprising a light source unit and an optical unit for generating a predefined light distribution is known from DE 10 2014 107 195 A1. The headlight further comprises a control unit that acts on the light source unit as a function of environmental conditions provided by a detection unit in such a way that an optimum light distribution is generated. The environmental condition includes environmental parameters, such as, for example, oncoming vehicles or light poles. A luminance estimation is performed in the control unit, which leads to correction control signals by means of which the predefined light distribution is optimized.

SUMMARY OF THE INVENTION

It is therefore an object of the present invention to provide a headlight for vehicles and a method for controlling the headlight such that the generation of a light distribution is further optimized depending on environmental conditions.

To achieve said object, the invention in is characterized in that an optimization program is stored in the control unit, by means of which optimization program the control signal is calculated from a plurality of individual control signals, wherein by means of the individual control signals different partial light distributions, each dependent on the environmental parameters, can be generated.

An advantage of the invention is that optimization of the light distribution takes place depending on different environmental conditions or traffic scenarios. A control signal, which is generated by a control unit and by means of which the light source unit and/or the optical unit are controlled, is generated by means of an optimization program depending on the presence and absence of a number of individual control signals, wherein the individual control signals are each used to generate different partial light distributions, each of which can be derived from a specific and independently present environmental parameter. If, for example, the adaptive high beam function of the headlight is switched on, the light distribution is continuously adjusted or optimized depending on the current environmental parameters. Advantageously, thus only as much light is emitted into the vehicle environment as is necessary, or the light is only directed to where it is needed. Advantageously, electrical energy can be saved without reducing the lighting quality. The basic idea of the invention is to classify the occurring environmental conditions. Each environmental parameter, such as, for example, type of road course, presence of pedestrians on the left or right side, road surface, weather, and street lighting, is assigned a partial light distribution which could be generated by means of an individual control signal. After querying the presence or absence of these environmental parameters, an optimization program is used to calculate the resulting control signal, by means of which the resulting light distribution is generated. The complex environmental scenario is thus divided or classified into individual environment scenarios, each of which is assigned a separate partial light distribution. By means of an optimization rule, the partial light distributions are linked with one another so that an optimized light distribution results, which is implemented by means of the corresponding control signal.

The environmental parameters in each case may merely provide light distribution-relevant individual information about the environmental conditions. Regarding the category "road course," e.g., the partial light distributions differ according to whether the vehicle is on a straight road or the road has a left branch or the road has a right branch. With regard to the category "pedestrian traffic," for example, the corresponding partial light distributions differ depending on whether there is a pedestrian or a pedestrian walkway on the left side or on the right side of the road.

The individual control signal can be formed as a digital signal which is either in an on state or in an off state, on the one hand, or in different stages, on the other hand. If a turn to the left is planned with regard to the category "road course," the individual control signal with regard to "straight road" and "turn to the right" would be in the off state and the individual control signal with regard to "turn to the left" would be in the on state. Thus, only the partial light distribution corresponding to the "turn to the left" would be used and combined with further partial light distributions according to the optimization rule.

A database can be provided for storing individual control signals characterizing the respective environmental parameters, which is preferably integrated in the control unit. Thus, all partial light distributions are stored that could be used to generate the resulting light distribution. This is done depending on the presence or absence of the environmental parameters assigned to the respective partial light distributions. Advantageously, only the determination of the existing environmental parameters is required for determining the control signal, so that the optimum light distribution can be generated by means of the control signal by selecting the corresponding "partial light distributions" stored in the database.

The control unit can be coupled to a detection unit and/or to an external transmission device, connected via a communication network (e.g., the Internet), for detecting or providing environmental parameters. The presence or absence of the environmental parameters can thus be determined relatively easily and currently, so that with the calculation of the control signal by an optimization rule, the desired light distribution is made up of the partial light distributions that are assigned to the environmental parameters present in each case.

The optimization program can be designed such that the current environmental parameters provided by the external transmission device are in each case compared for correspondence with the respective current environmental parameters provided by the detection unit and that, if a deviation is detected between the respective environmental parameters, the respective environmental parameter provided by the detection unit is used to form the individual control signal.

In this way, a check and, if necessary, correction of the externally provided environmental parameters take place.

The control unit can have a processor of which the individual control signals for the corresponding partial light distributions can be calculated from the currently present environmental parameters and the control signal for the light distribution is calculated therefrom by means of the optimization rule. Preferably, the individual control signals corresponding to the environmental parameters are stored in the database. Advantageously, the relevance of the corresponding partial light distributions can be determined by comparing the currently present environmental parameters.

According to a refinement of the invention, the optimization program is designed such that spatial positions of the different partial light distributions are compared with one another with regard to their illuminance values and the control signal is determined for each spatial position using the optimization rule. According to the invention, an evaluation of the individual spatial positions of the light distributions is carried out depending on the currently present environmental parameters, so that the illuminance values are set as a function of location. The light is brought to the appropriate place in the vehicle environment only to such an extent as is necessary.

The optimization rule can be designed such that the optimal and/or maximum illuminance value for each spatial position is selected from the partial light distributions determined to be present. Depending on the resolution of the headlight, especially in the case of light sources arranged in a matrix-like manner, an optimal light distribution can thus take place depending on the location.

The individual control signals of the different environmental parameters can be provided weighted according to a weighting rule. For example, the weighting factor for the category "pedestrian traffic" can be greater if a larger number of pedestrians are detected compared to a small number of pedestrians.

An advantage of the method of the invention is that an optimal light distribution is generated by categorizing the vehicle environment in the form of partial light distributions or individual control signals assigned to different environmental parameters in each case for controlling the light source unit or the optical unit in such a way that a corresponding partial light distribution is generated, and by combining these partial light distributions in accordance with an optimization rule. According to the headlight resolution, the light is brought to the spatial positions of the light distribution or the vehicle environment only to the extent that it is necessary and sufficient. It is advantageously prevented that too much light is generated at certain spatial positions.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 2 shows an allocation table of various environmental parameters to partial light distributions;

DETAILED DESCRIPTION

A headlight for vehicles is located in a front-end area of a vehicle. It comprises a light source unit 1 with a plurality of light sources 2 arranged in a matrix-like manner. Light sources 2 are preferably designed as LED light sources arranged on a common support. The LED light sources 2 are arranged in a matrix-like manner with a predefined number, so that a pixel light system with a plurality of small pixels of a light distribution L can be generated by means of such a matrix headlight.

Figure 1:
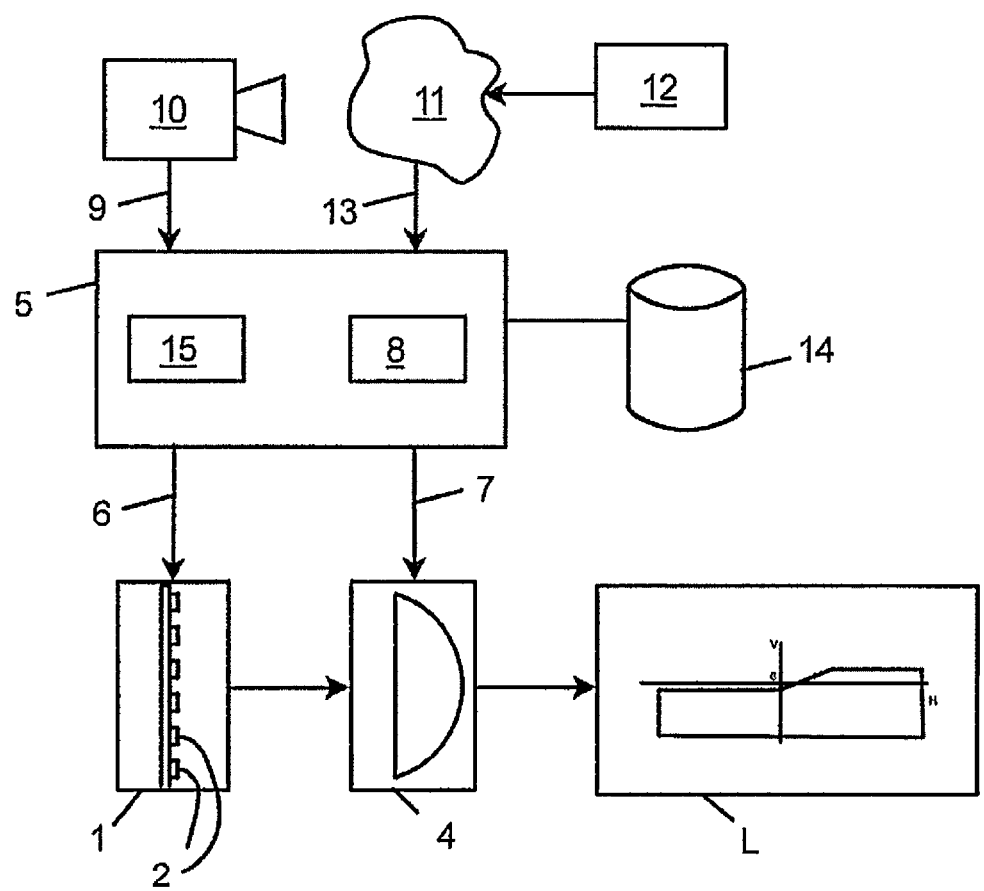
FIG. 1 is a block diagram of a headlight of the invention.
Figure 3A:
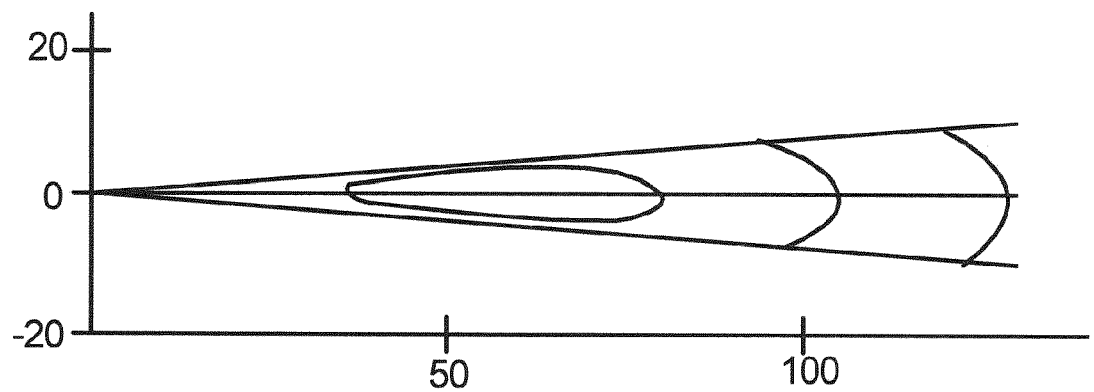
FIG. 3a shows a partial light distribution in the area in front of the vehicle for the environmental parameter "road course straight"
Figure 3B:
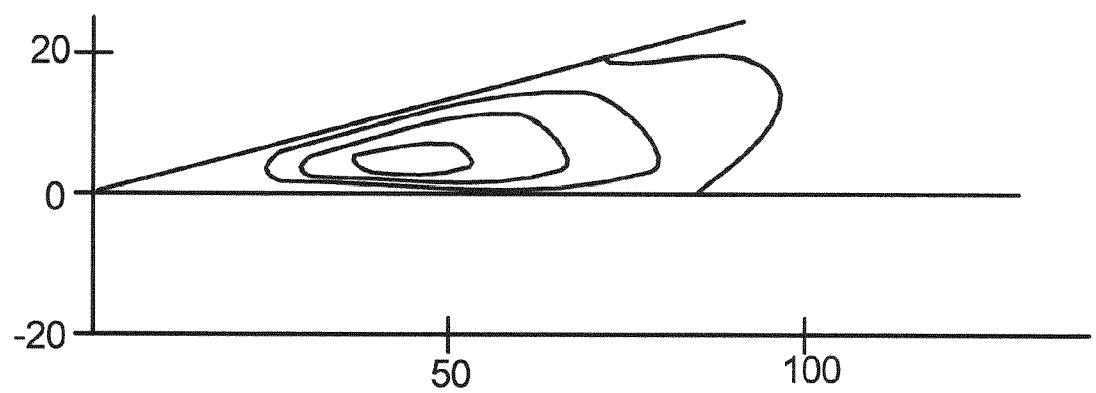
FIG. 3b shows a partial light distribution in the area in front of the vehicle for the environmental parameter "road course to the left"
Figure 3C:
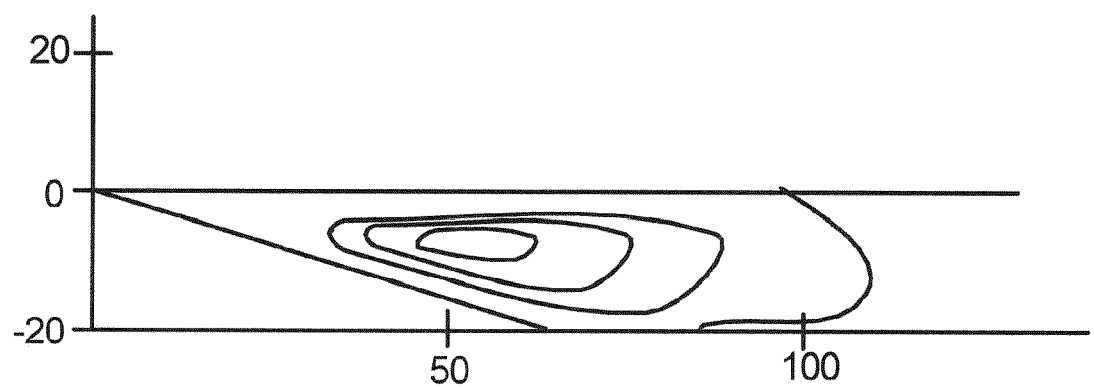
FIG. 3c shows a partial light distribution in the area in front of the vehicle for the environmental parameter "road course to the right"
Figure 3D:
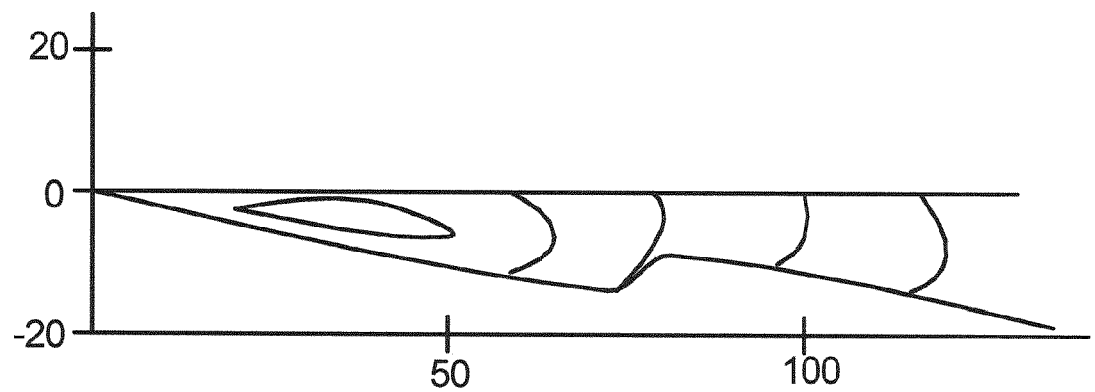
FIG. 3d shows a partial light distribution in the area in front of the vehicle for the environmental parameter "pedestrian on right"
Figure 3E:
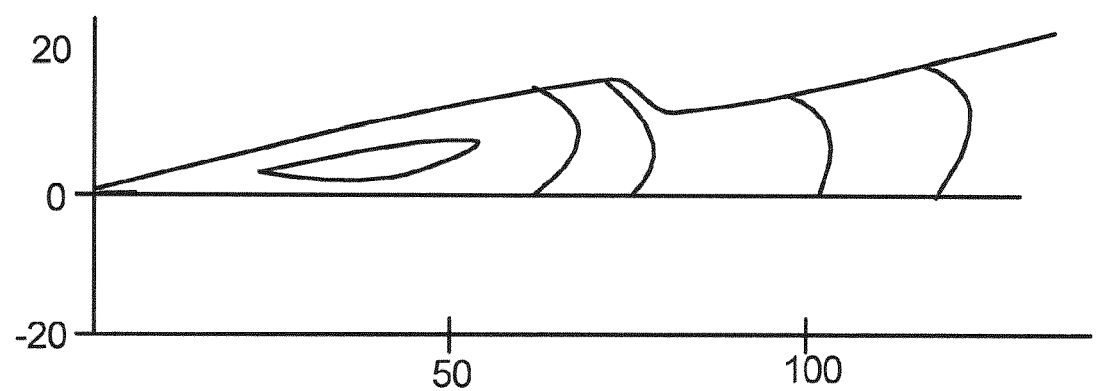
FIG. 3e shows a partial light distribution in the area in front of the vehicle for the environmental parameter "pedestrian on left"
Figure 3F:
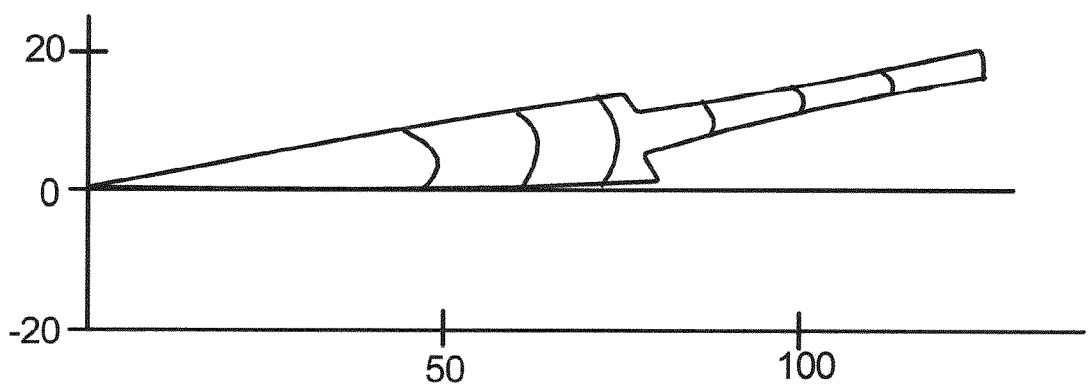
FIG. 3f shows a partial light distribution in the area in front of the vehicle for the environmental parameter "oncoming traffic present"
Figure 3G:
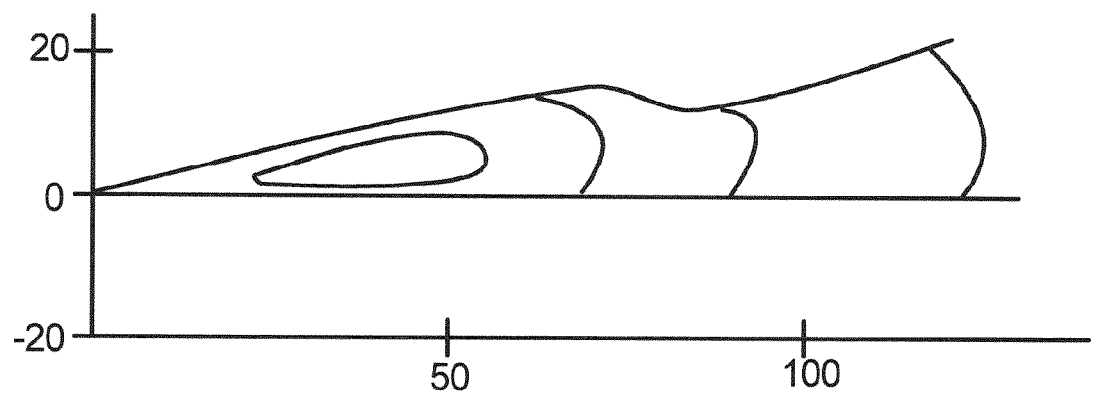
FIG. 3g shows a partial light distribution in the area in front of the vehicle for the environmental parameter "oncoming traffic absent"
Figure 4:
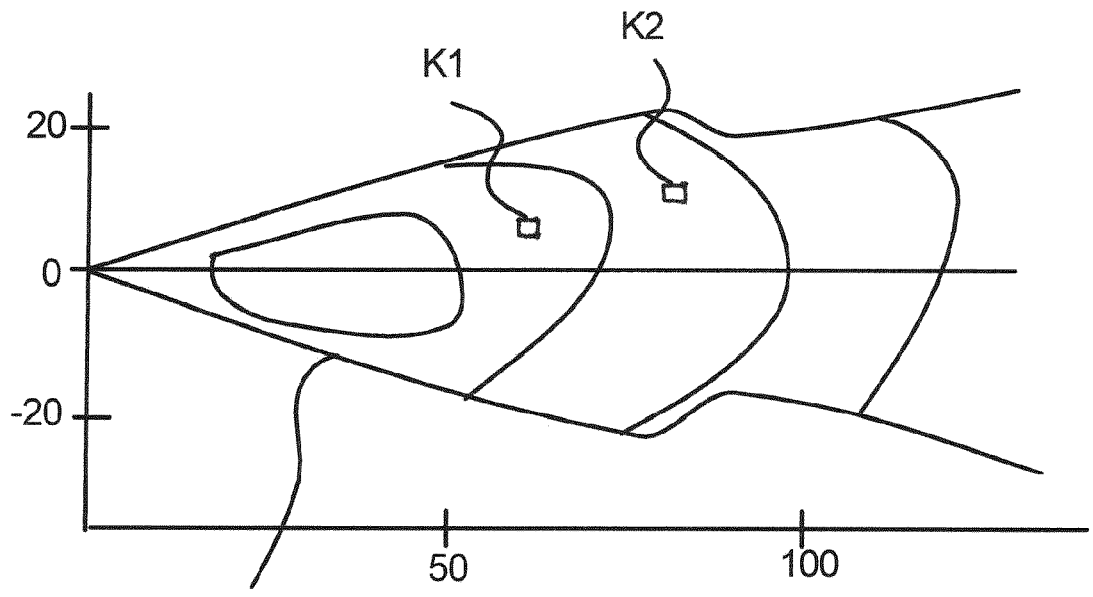
FIG. 4 shows a resulting light distribution in the area in front of the vehicle.

To depict the light emitted from light sources 2, an optical unit 4 is provided, which has, for example, a predefined number of lenses. The headlight can be designed as a scanning headlight, wherein the light source is designed as a laser light source and optical unit 4 as a deflection unit. Alternatively, optical unit 4 can also have a plurality of liquid crystal elements or micromirror elements, so that suitable controlling of optical unit 4 results in an LCD pixel light system (LCD=liquid crystal display) or a micromirror-based pixel system (DMD=digital micromirror device). Depending on the design of optical unit 4, a control signal 6 is emitted by means of a control unit 5 to light source unit 1 and/or a control signal 7 is emitted to optical unit 4, by means of which the light distribution L shown in FIG. 4 is generated.

Control unit 5 has an optimization program 8 by means of which control signal 6, 7 is generated. For this purpose, optimization program 8 takes into account current environmental parameters 9, which can be provided by a detection unit 10 coupled to control unit 5. For example, detection unit 10 can include a camera and/or sensors.

Alternatively or in addition, control unit 5 is coupled via a communication network 11 (for example, the Internet) to a transmission device 12, which transmits, for example, weather data and/or road condition data or the like as environmental parameters 13. For example, transmission device 12 can be cloud-based or integrated into another vehicle, preferably a vehicle in front.

Different categories of environmental parameters 9, 13 that are taken into account in generating the light distribution L are listed in FIG. 2. The first category concerns the "road course" category, wherein "road course straight," "road course to the left," and "road course to the right" are specified as environmental parameters. Alternatively, refinements of this category with multiple possibilities can be provided. The second category concerns the "number of pedestrians," wherein "pedestrians on left few," "pedestrians on left many," "pedestrians on right few," and "pedestrians on right many" are specified as environmental conditions. Each of these preselected environmental conditions is assigned a partial light distribution TL1, TL2, TL3 . . . Tn. The corresponding partial light distribution TL1, TL2 . . . TLn can be generated by a corresponding individual control signal A1, A2, $A_n$, with which light source unit 1 and/or optical unit 4 are controlled. In contrast to the category "road course", where different road courses are queried, a number range of the presence of pedestrians on the left and/or right side is also queried in the category "pedestrians." Depending on the pedestrian traffic, pedestrians can thus be optimally taken into account in the light distribution L.

In the third category, "oncoming traffic", the presence and absence of oncoming traffic is taken into account. In the fourth category, the current weather is taken into account. In the fifth category, the road surface is taken into account. In the sixth category, the location of the vehicle is taken into account. The nth category can concern the street lighting, for example. The number of categories is arbitrary; it depends on the accuracy requirement.

Different partial light distributions associated with corresponding environmental parameters 9, 13 are shown in FIG. 3. The environmental parameters 9, 13 thus provide light distribution-relevant individual information about the environmental conditions of the vehicle, wherein the individual control signals A1, A2, $A_n$ required in each case for generating the partial light distribution TL1, TL2, . . . TLn are stored in a database 14 connected to control unit 5.

The optimization program 8 is designed such that the categories or the presence or absence of the total number of environmental parameters 9, 13 are queried sequentially, wherein there are only two binary signals for each query, namely "1" for presence and "0" for absence. This is done in step S1 according to FIG. 5. In each case, the signal is a digital signal which, according to an embodiment which is not shown, can also be present in a number of stages (dimming stages).

If the presence of an environmental parameter is affirmed, this means that corresponding individual control signals A1 . . . $A_n$, stored in database 14, are taken into account for determining control signal 6, 7. Environmental parameters that are currently not present and to which the digit "0" is assigned have the effect that the corresponding control signal A1 is not taken into account for determining control signal 6, 7.

Control unit 5 has a microprocessor as a processor/computing component 15, by means of which the optimization program is run.

In a further step S2, the optimization program applies an optimization rule by means of which control signal 6, 7 is generated from the relevant individual control signals A1 . . . $A_n$ marked with "1." According to a first variant of the optimization rule, identical pixel-like spatial positions or pixel-like location coordinates K1, K2, Kn of the partial light distributions TL1 . . . TLn assigned to the respective present environmental parameters are checked to determine which of the partial light distributions TL1 . . . TLn provides the maximum illuminance value. This is then used for the resulting light distribution L in the further step S3. In the present exemplary embodiment, the environmental parameters regarding "road course straight," "pedestrians on left few," "pedestrians on right many," "oncoming traffic yes," "weather dry," "road surface asphalt," and "city street" are present, so that the partial light distributions TL1, TL4, TL7, TL8, TL12, TL13, TL16 are linked together. This is done in such a way that these partial light distributions TL1, TL4, TL7, TL8, TL12, TL13, TL16 are "superimposed" as it were and the maximum illuminance values at the respective location coordinates K1, K2, Kn of these partial light distributions TL1, TL4, TL7, TL8, TL12, TL13, TL16 are determined, from which the current light distribution L is then formed. The corresponding control signal is determined by optimization program 8 and transferred to light source unit 1 and/or optical unit 4 in step S3.

According to an alternative embodiment of the invention (not shown), the partial light distributions TL1, TL2, . . . TLn or the corresponding individual control signals A1, A2, An assigned to the respective environmental parameters present can be weighted according to a weighting rule to determine the control signal. In the present exemplary embodiment, it is assumed that all relevant categories with the same proportion of illuminance values are compared with one another and the maximum illuminance value related to the location coordinates K1, K2, Kn of the maximum illuminance value is used. If, for example, the fifth category "road surface" should have a subordinate importance compared to the other categories, the corresponding individual control signal can be included not with a factor of 1, but with a factor between 0 and 1. For example, if the fifth category at a certain location K1, K2, Kn specifies the maximum illuminance value, it would be correspondingly smaller, for example, decrease to half, if the weighting factor is 0.5, and thus the illuminance value in the light distribution L at this spatial position would be smaller.

Figure 5:
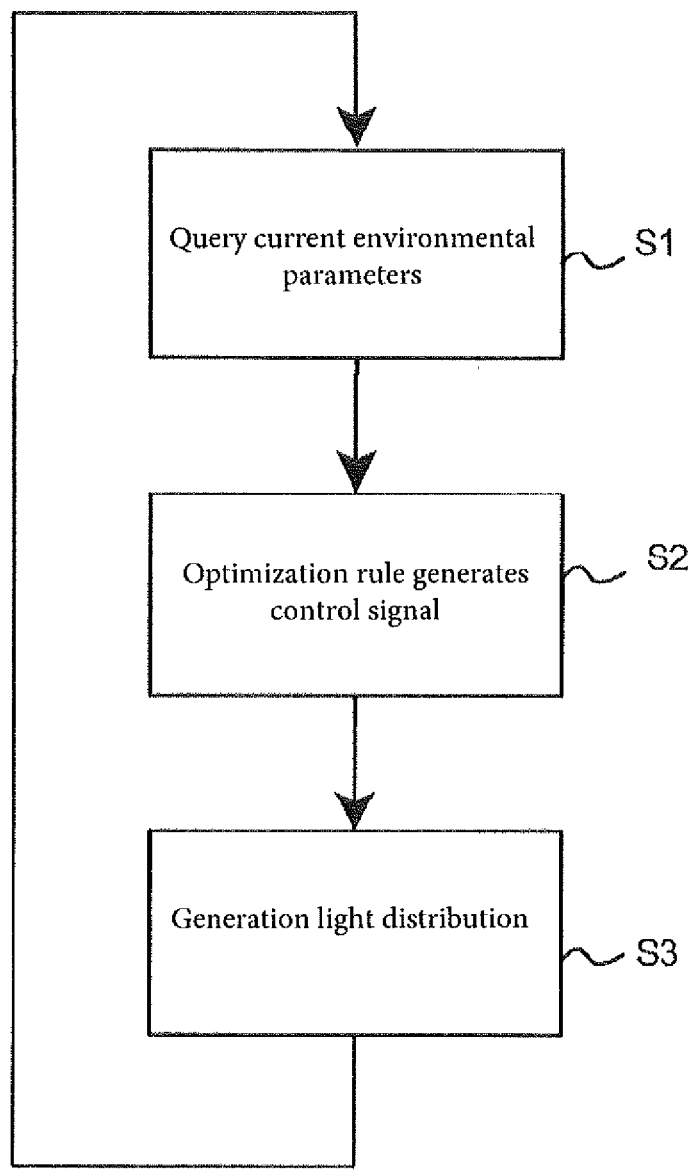
FIG. 5 shows a flowchart of the lighting control system.

As can be seen in FIG. 5, the current environmental parameters are queried continuously and repeatedly, so that the light distribution L can be changed or adjusted immediately if the environmental conditions change.

The invention being thus described, it will be obvious that the same may be varied in many ways. Such as variations are not to be regarded as a departure from the spirit and scope of the invention, and all such modifications as would be obvious to one skilled in the art are to be included within the scope of the following claims.

What is claimed is:

1. A headlight for vehicles, the headlight comprising:
a light source unit that emits light;
an optical unit to deflect the light in accordance with a predefined light distribution; and
a control unit to generate a control signal, the light source unit and/or the optical unit being controlled by the control unit,
wherein the control signal is generated depending on environmental parameters,
wherein an optimization program is stored in the control unit, the control signal being calculated, via the optimization program, from a plurality of individual control signals,
wherein, via the individual control signals, different partial light distributions, each dependent on the environmental parameters, are generated,
wherein the control unit is coupled to a detection unit provided in the vehicle to detect the environmental parameters and to an external transmission device that is provided external to the vehicle to detect the environmental parameters, the external transmission device transmitting the environmental parameters to the control unit via a communication network, and
wherein the optimization program is designed such that the respective environmental parameters that are currently provided by the external transmission device are compared for correspondence with the respective environmental parameters that are currently provided by the detection unit, and wherein, if a deviation is detected between the respective environmental parameters, the respective environmental parameter provided by the detection unit is used to form the individual control signal.

2. The headlight according to claim 1, wherein each of the environmental parameters is assigned a separate one of the individual control signals and each individual control signal is assigned a separate one of the partial light distributions, such that the partial light distributions that are generated relate to the environmental parameters.

3. The headlight according to claim 1, wherein each of the environmental parameters provide light distribution-relevant individual information about environmental conditions around the vehicle.

4. The headlight according to claim 1, wherein each individual control signal is formed as a digital signal which is either in an on state or in an off state or in a number of stages.

5. The headlight according to claim 1, wherein a database is provided to store the individual control signals that represent respective environmental parameters.

6. The headlight according to claim 1, wherein the control unit has a processor via which a presence or absence of the individual control signals is determined by comparison of the environmental parameters that are currently provided by the detection unit and/or the external transmission device with the environmental parameters stored in the database, and wherein the control signal is calculated from the individual control signals that are currently present via an optimization rule.

7. The headlight according to claim 1, wherein the optimization program is designed such that spatial positions of the different partial light distributions that are present are compared with one another with respect to illuminance values and the control signal is determined for each spatial position using an optimization rule.

8. The headlight according to claim 7, wherein the optimization rule is designed such that a maximum or optimal illuminance value of the spatial position is selected from the partial light distributions in each case.

9. The headlight according to claim 1, wherein the individual control signals of the different environmental parameters are provided weighted according to a weighting rule.

10. A method for controlling a headlight according to claim 1, the method comprising:
assigning stored individual control signals to environmental parameters in order to generate partial light distributions, which are dependent on the respective environmental parameters;
determining a presence or absence of the environmental parameters by the detection unit provided in the vehicle and by the external transmission device that is provided external to the vehicle and that is connected to the control unit via the communication network; and
calculating the control signal as a function of the current presence of the environmental parameters in accordance with an optimization rule of the optimization program,
wherein the optimization program is designed such that the respective environmental parameters that are currently provided by the external transmission device are compared for correspondence with the respective environmental parameters that are currently provided by the detection unit, and wherein, if a deviation is detected between the respective environmental parameters, the respective environmental parameter provided by the detection unit is used to form the individual control signal.

11. The method according to claim 10, wherein, after determination of the current individual control signals, specifying the respective different partial light distributions, wherein location-related illuminance values of the partial light distributions are compared with one another and illuminance values of the light distribution generated by the control signal are calculated location-related according to the optimization rule.

12. The method according to claim 10, wherein the control signal is calculated from weighted or non-weighted individual control signals.

13. The method according to claim 11, wherein, via the optimization rule, the respective location-related maximum illuminance values of the partial light distributions are used to determine the control signal.

* * * * *